United States Patent
Chen et al.

(10) Patent No.: US 9,937,941 B2
(45) Date of Patent: Apr. 10, 2018

(54) TAKEDOWN UTILITY CART

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE Co.,Ltd., Taichung (TW)

( * ) Notice: Subject to any disclaimer, the term of this patent is extended or adjusted under 35 U.S.C. 154(b) by 0 days.

(21) Appl. No.: 14/817,649

(22) Filed: Aug. 4, 2015

(65) Prior Publication Data
US 2017/0297597 A1  Oct. 19, 2017

(51) Int. Cl.
*B62B 3/02* (2006.01)
*B62B 3/00* (2006.01)

(52) U.S. Cl.
CPC ................... *B62B 3/005* (2013.01)

(58) Field of Classification Search
CPC ......... B62B 3/002; B62B 3/003; B62B 3/005; B62B 3/02
USPC .............. 280/47.34, 47.35, 79.11, 79.2, 79.3
See application file for complete search history.

(56) References Cited

U.S. PATENT DOCUMENTS

| | | | | |
|---|---|---|---|---|
| 4,763,799 A | * | 8/1988 | Cohn | A47B 31/00 108/147.13 |
| 5,257,860 A | * | 11/1993 | Slivon | E05B 65/462 312/218 |
| 6,688,615 B2 | * | 2/2004 | Chen | A47G 23/0225 280/47.35 |
| 9,266,547 B2 | * | 2/2016 | Schumaker | B62B 3/005 |
| 2008/0157494 A1 | * | 7/2008 | Nieh | B25H 3/00 280/47.34 |

* cited by examiner

*Primary Examiner* — John D Walters

(57) ABSTRACT

A takedown utility cart includes rectangular platforms each having four corners, each platform including a main panel having four beams; four sets of post sections, each set secured through one corners of the platforms; two side walls each threadedly fastened between sides of two adjacent platforms; a rear panel having two sides threadedly secured to rear ends of the side walls respectively so that an open space is defined by the platforms, the side walls, and the rear panel; at least one drawer retractably mounted in the space; and a lock assembly mounted on the rear panel for locking or unlocking the drawer.

9 Claims, 14 Drawing Sheets

TAKEDOWN UTILITY CART

BACKGROUND OF THE INVENTION

1. Field of the Invention

The invention relates to carts and more particularly to a takedown utility cart having an arrangement for reducing vibrations while wheeling.

2. Description of Related Art

Conventionally, a utility cart includes a metal frame and a plurality of shelves. However, it is subject to rust, thereby shortening its useful life.

There is a commercially available utility cart includes a plurality of support posts and beams, a plurality of shelves vertically mounted on the support posts and the beams, a plurality of drawers each retractably disposed in a space between two adjacent shelves, and four wheels on the bottom ends of the support posts.

However, the conventional utility cart may vibrate strongly when wheeling due to unreliable connections of its components. To the worse, the components may disengage and fall to the ground, resulting in a malfunction of the utility cart.

Thus, the need for improvement still exists.

SUMMARY OF THE INVENTION

It is therefore one object of the invention to provide a takedown utility cart comprising a plurality of rectangular platforms each having four corners, each platform including a main panel made of plastic, and four beams on four edges of the main panel respectively; four sets of a plurality of tubular post sections, each set of the post sections secured through one corners of the platforms; a plurality of side walls each threadedly fastened between sides of two adjacent platforms, each side wall having front and rear ends urging against the post sections of one set and the post sections of the adjacent set respectively, each side wall including two end members; at least one rear panel having two sides threadedly secured to rear ends of the side walls respectively so that an open space is defined by the platforms, the side walls, and the at least one rear panel; at least one set of two slides on inner surfaces of the side walls; at least one drawer each configured to retractably mount in the space by slidably securing to the slides of the same set; and a lock assembly mounted on the rear panel for locking or unlocking the drawer.

The above and other objects, features and advantages of the invention will become apparent from the following detailed description taken with the accompanying drawings.

DETAILED DESCRIPTION OF THE INVENTION

Figure 1:
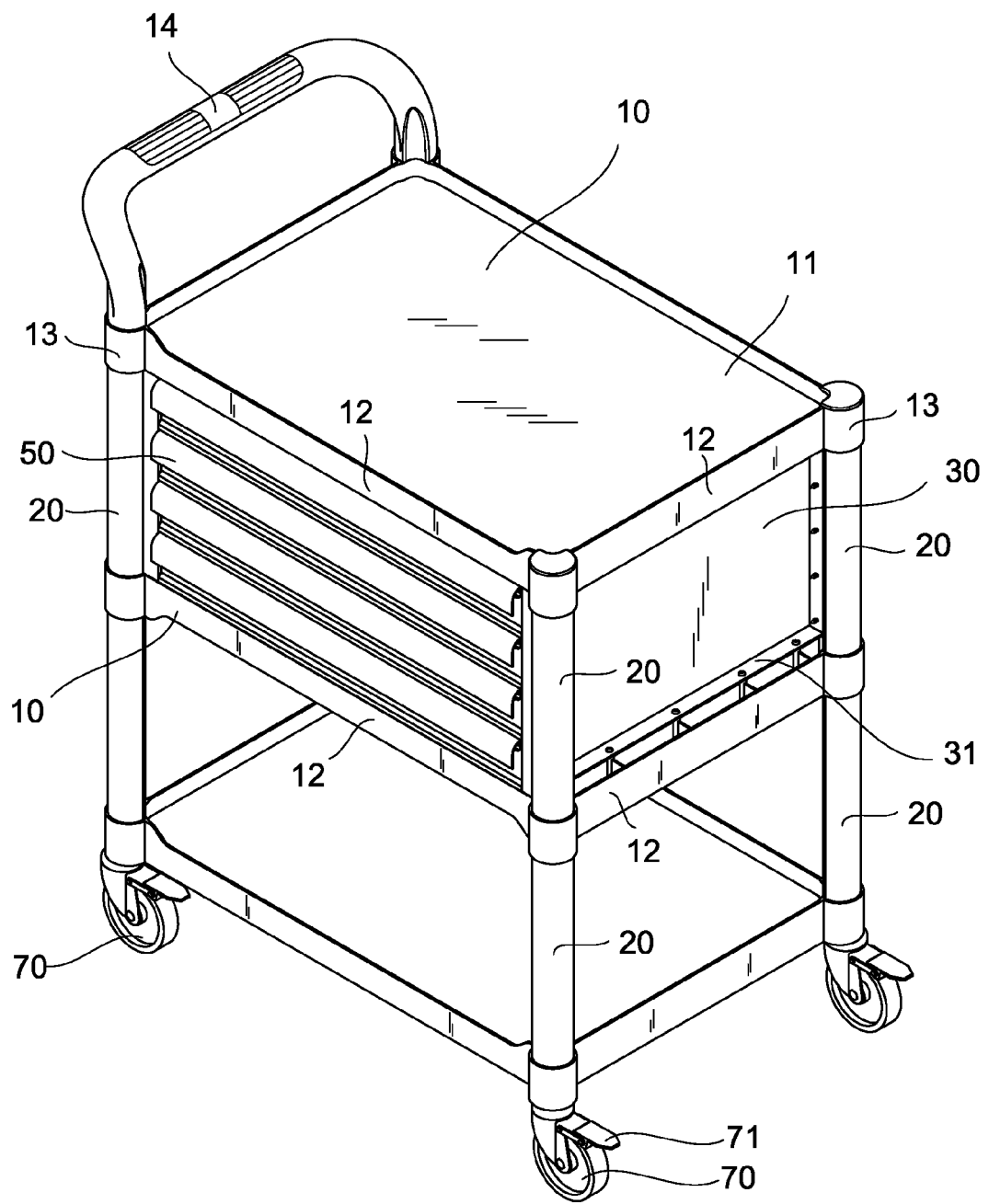
FIG. 1 is a perspective view of a takedown utility cart according to the invention.
Figure 2:
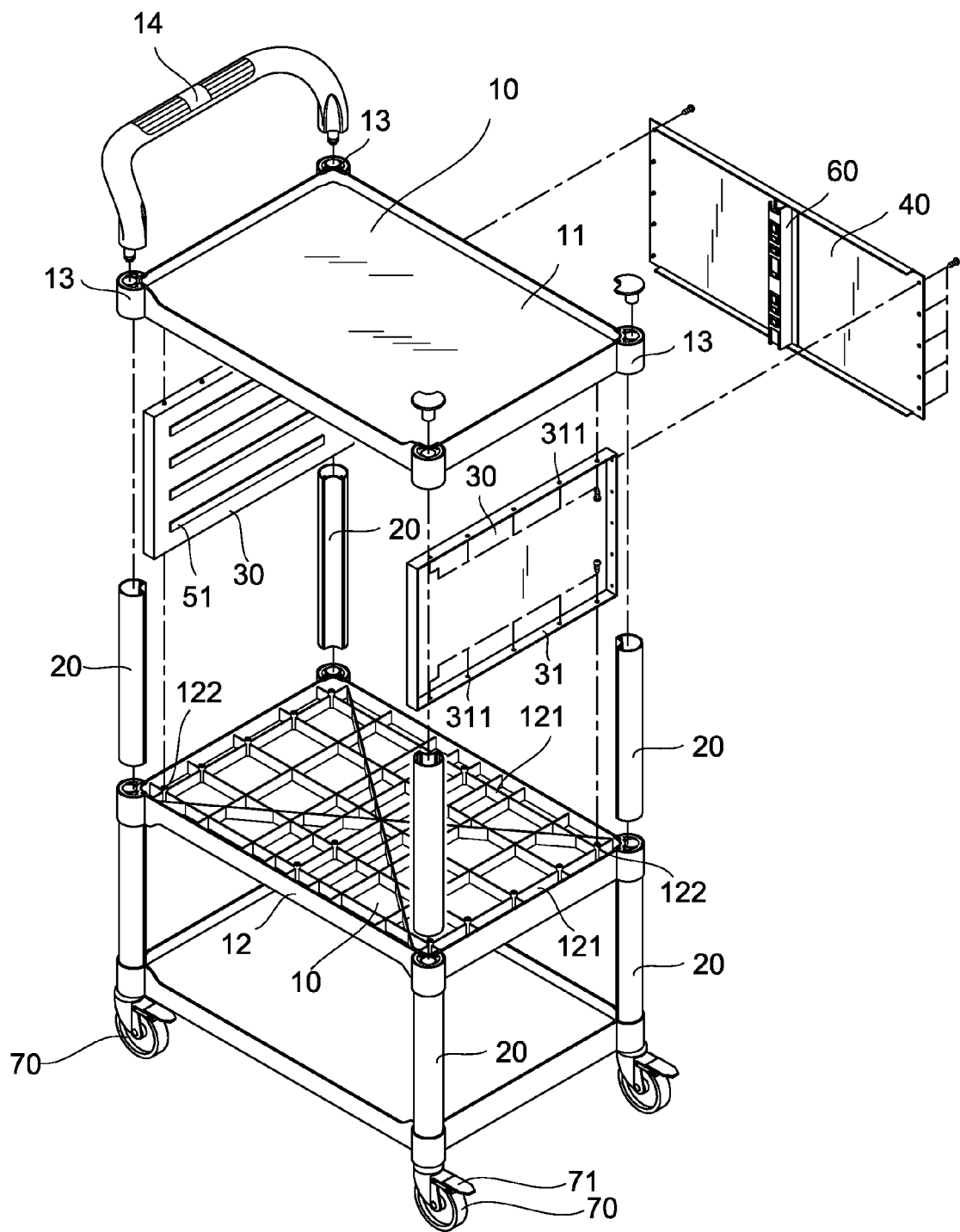
FIG. 2 is a partially exploded view of the takedown utility cart with the drawers removed.
Figure 3:
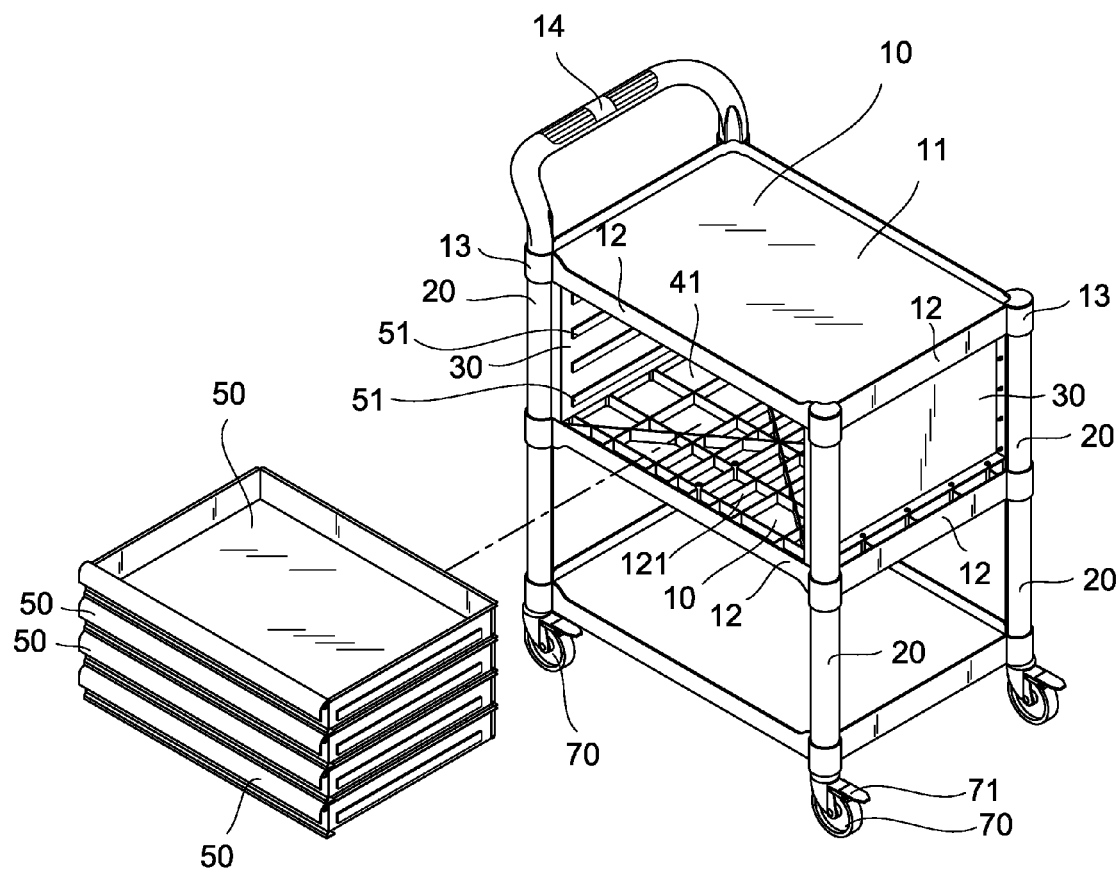
FIG. 3 is a perspective view of the takedown utility cart with the drawers removed.
Figure 4:
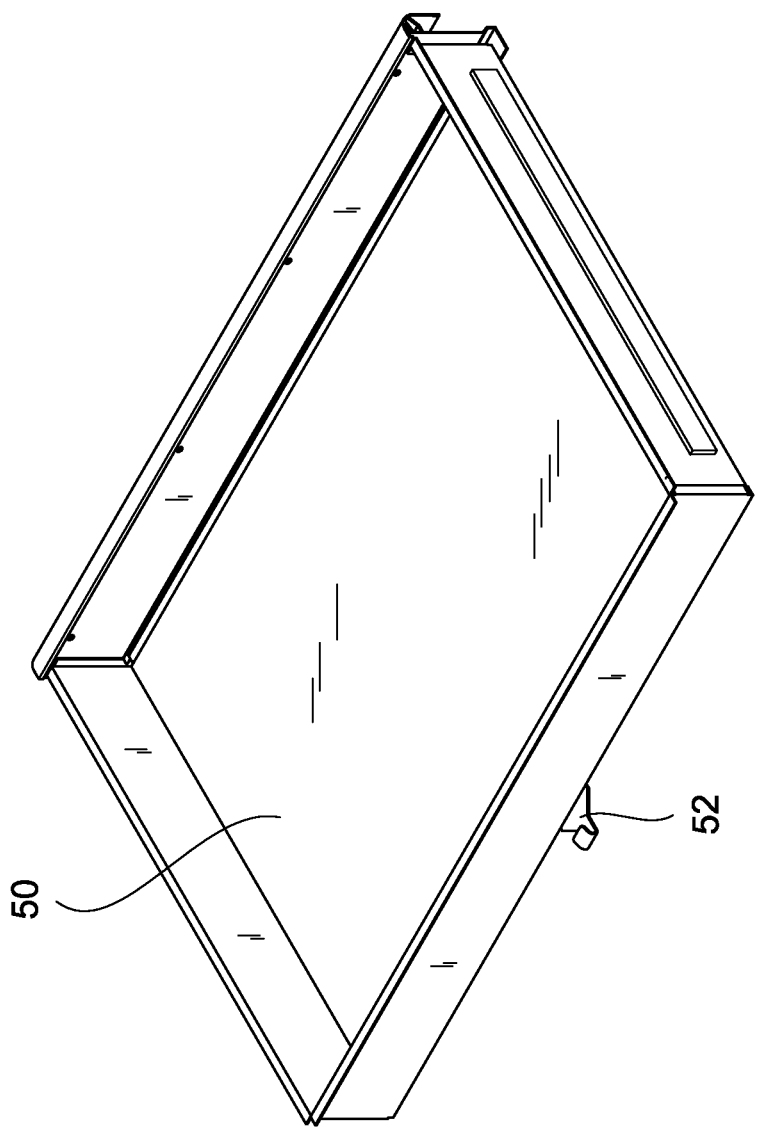
FIG. 4 is a perspective view of the drawer.

Referring to FIGS. 1 to 13, a takedown utility cart in accordance with the invention comprises the following components as discussed in detail below.

Two platforms 10, a plurality of post sections 20, two side walls 30, a rear panel 40, a plurality of drawers 50, a lock assembly 60, and four wheels 70 are provided. The platform 10 includes a rectangular main panel 11 made of plastic, four beams 12, four corner joints 13 each formed with two adjacent beams 12, a latticework 121 formed in an area surrounded by the beams 12, a plurality of thread holes 122 formed in the latticework 121 adjacent to the beams 12, and a handle 14 releasably secured to two joints 13 at one side.

The post sections 20 are tubular. The post sections 20 of one of four sets are disposed from the joint 13 at one of four corners of the upper platform 10 through the joint 13 at one of four corners of the lower platform 10 to the wheel 70. The side wall 30 is rectangular and includes upper and lower end members 31 each having a plurality of thread holes 311 aligned with the thread holes 122 so that the side walls 30 can be fastened between the upper and lower platforms 10 by driving threaded fasteners through the threads holes 122 into the thread holes 131 or vice versa.

The rear panel 40 is rectangular and has two sides threadedly secured to a rear end of the side wall 30. An open space 41 is defined by the platforms 10, the side walls 30, and the rear panel 40. A plurality of horizontal slides 51 are provided on an inner surface of each side wall 30. Thus, the drawers 50 can be retractably mounted in the space 41 by slidably securing to the slides 51. The drawer 50 includes a projecting snapping member 52 on a rear end. A wheel lock 71 is provided above each wheel 70 and is adapted to lock the wheel 70 for positioning the takedown utility cart after moving to a desired place.

Figure 5:
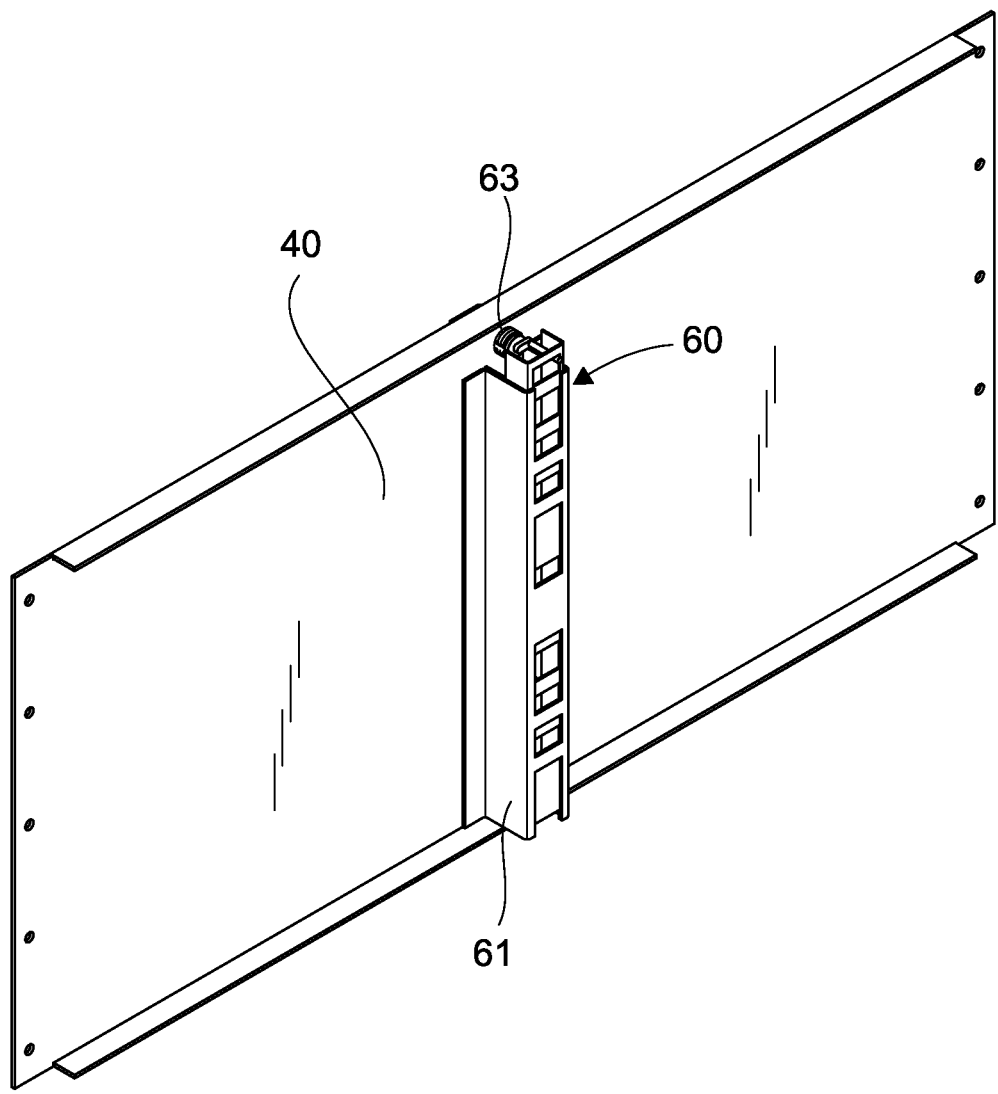
FIG. 5 is a perspective view of a rear panel and a lock assembly of a first preferred embodiment of the takedown utility cart.
Figure 6:
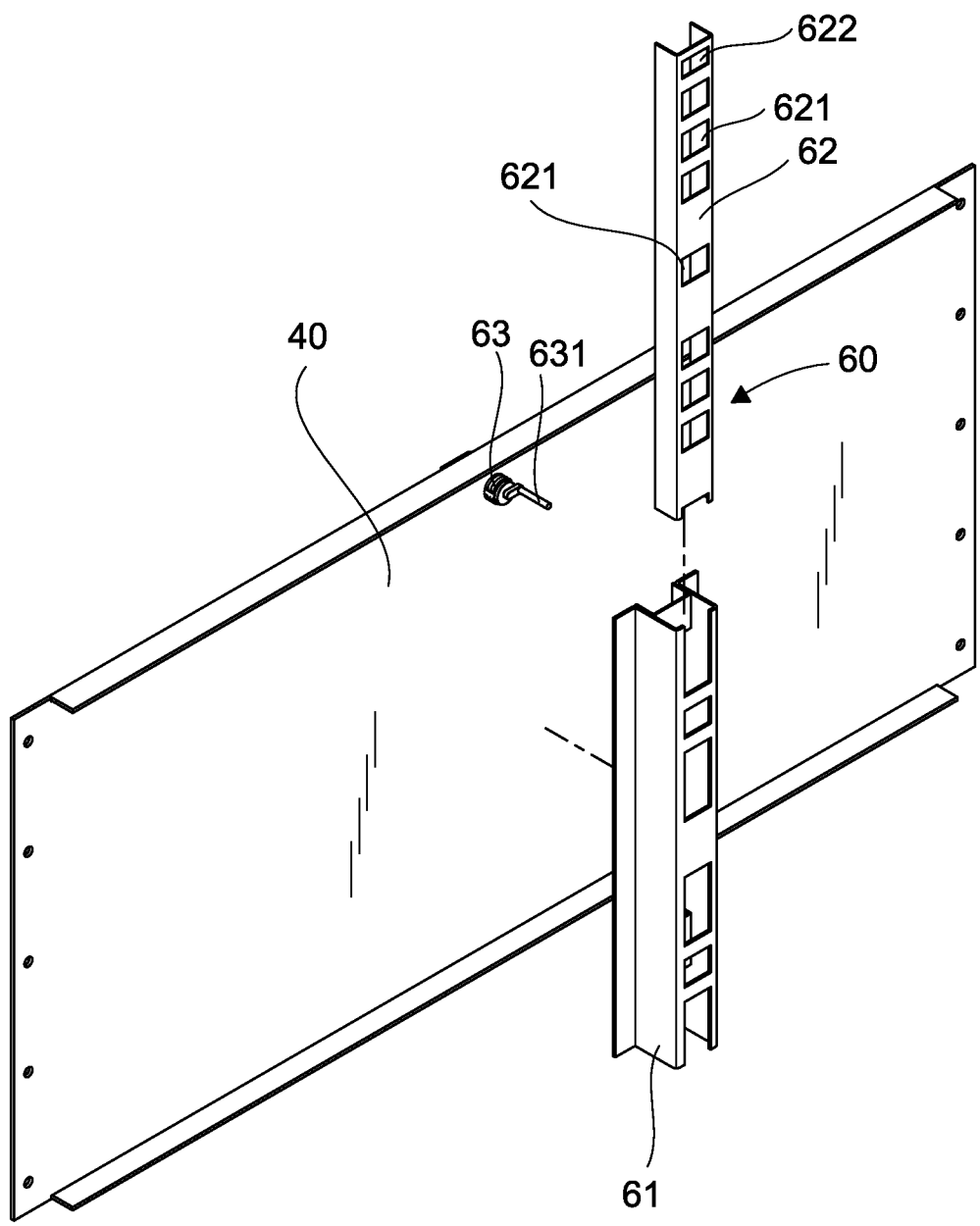
FIG. 6 is an exploded view of FIG. 5.

As shown in FIGS. 5 and 6, the lock assembly 60 is mounted on an inner surface of the rear panel 40 and includes an elongated, hollow sliding seat 61, an elongated, hollow lock member 62 having a plurality of apertures 621 disposed vertically on one surface, and a lock hole 622 above the top aperture 621, and a lock element 63 having an eccentric rod 631. The snapping member 52 is received in the aperture 621. The lock member 62 is shaped to complimentarily dispose in the sliding seat 61.

Figure 7:
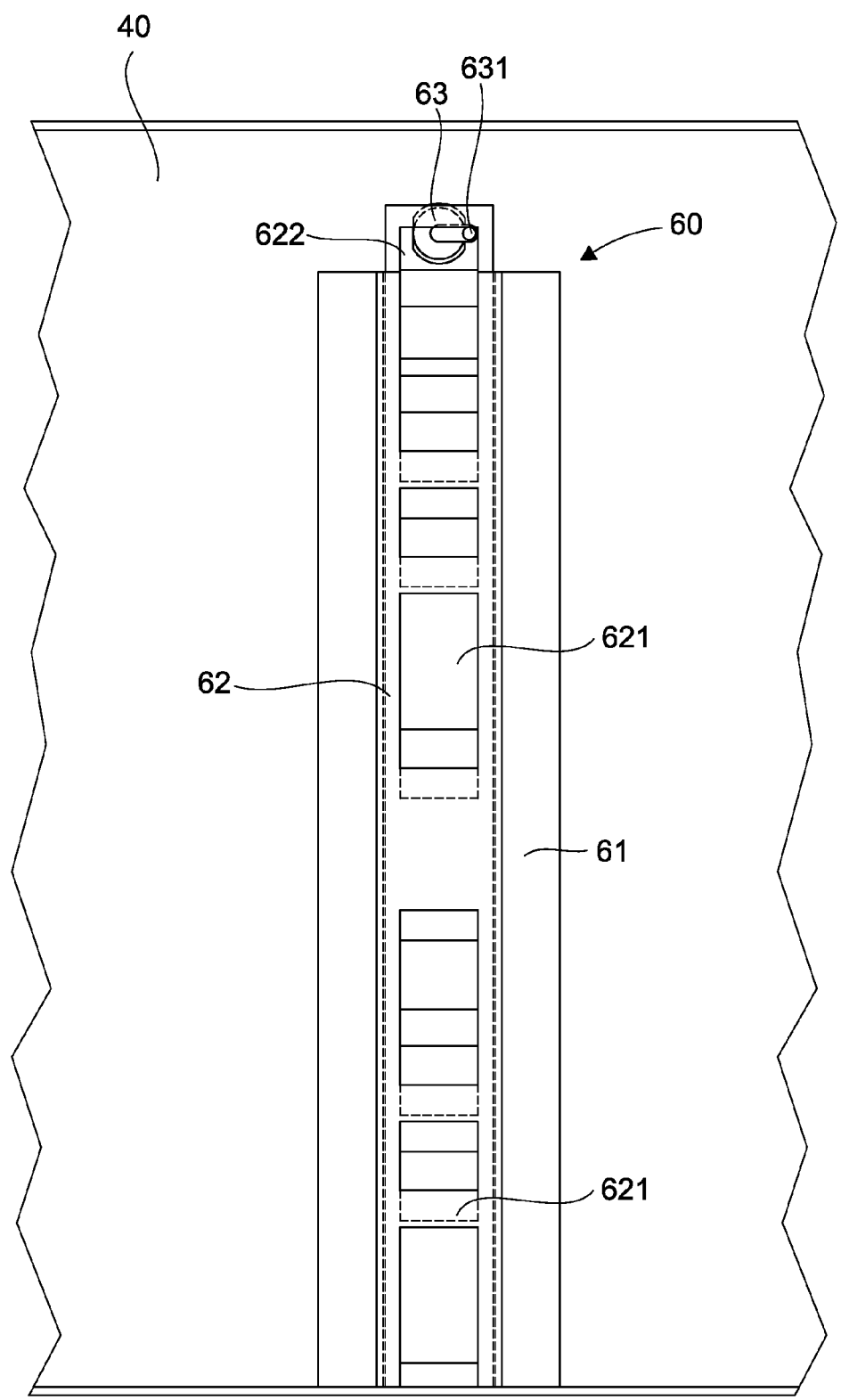
FIG. 7 is an enlarged plan view of FIG. 5 where the lock assembly is locked.
Figure 8:
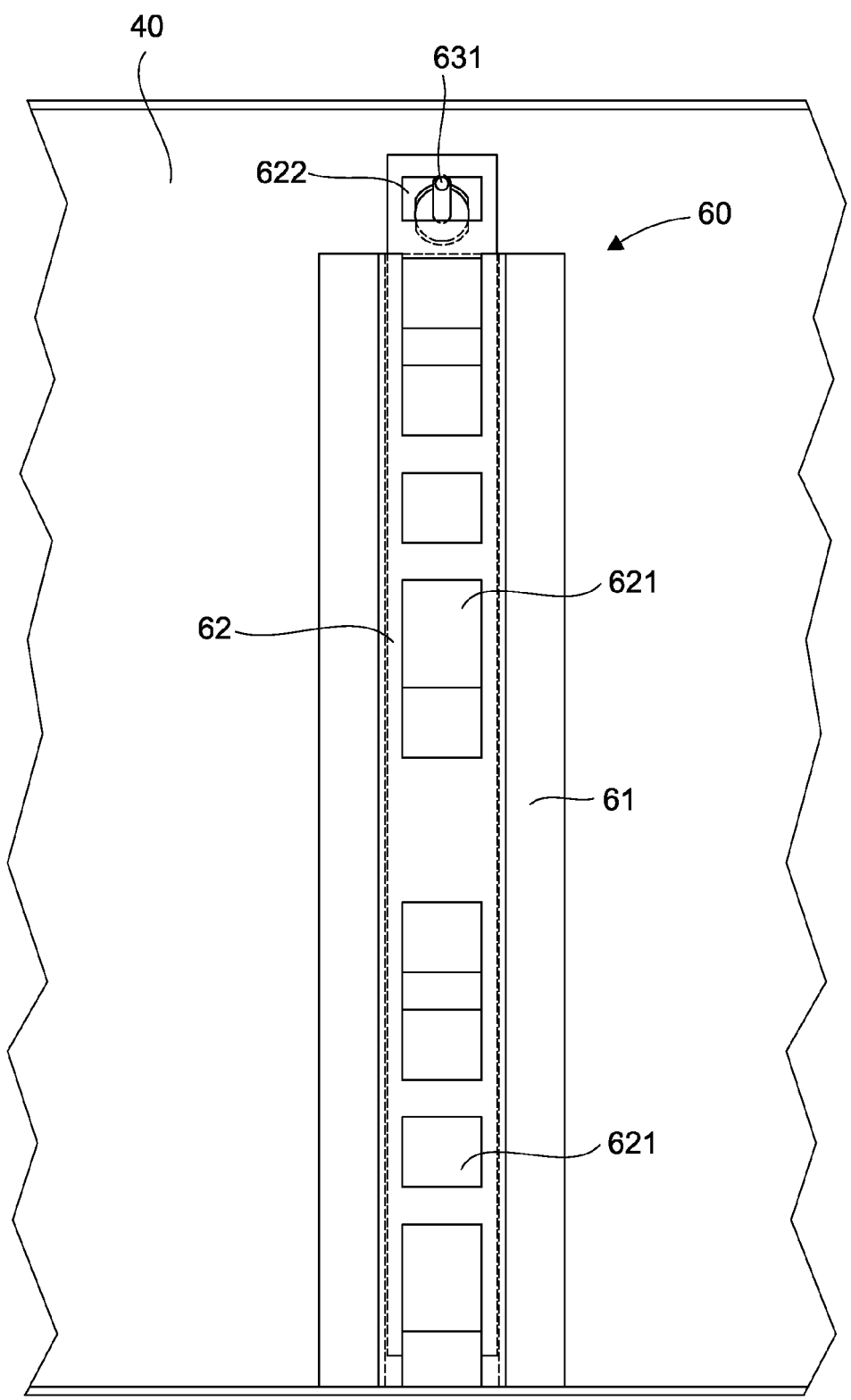
FIG. 8 is a view similar to FIG. 7 where the lock assembly is unlocked.

As shown in FIGS. 7 and 8, operations of the lock assembly 60 of a first preferred embodiment of the takedown utility cart are described below. First, a key (not shown) is inserted into the lock element 63 to rotate the eccentric rod 631 to lift the lock hole 622 and the lock member 62 so that the snapping member 52 clears the aperture 621. As a result, the drawer 50 having the snapping member 52 is free to pull.

Figure 9:
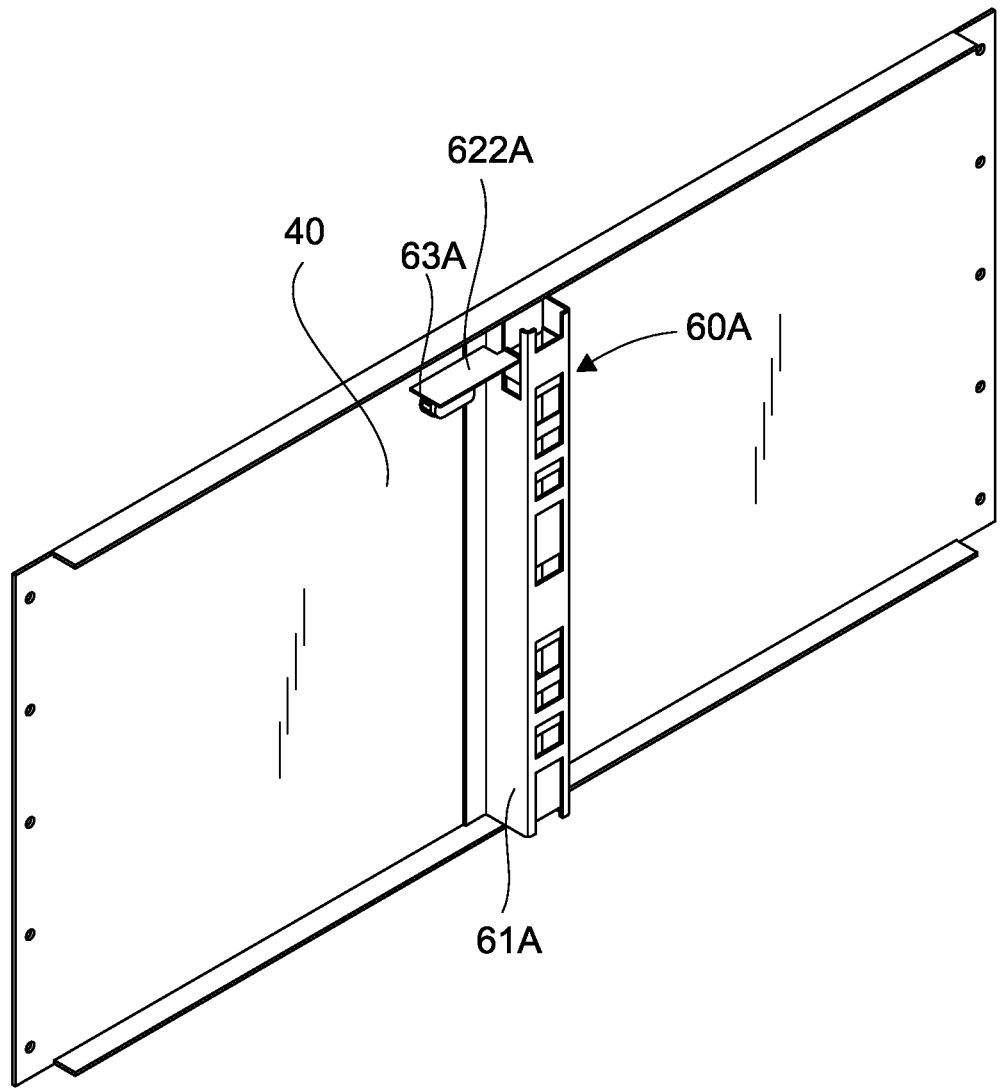
FIG. 9 is a perspective view of the rear panel and a lock assembly of a second preferred embodiment of the takedown utility cart.
Figure 10:
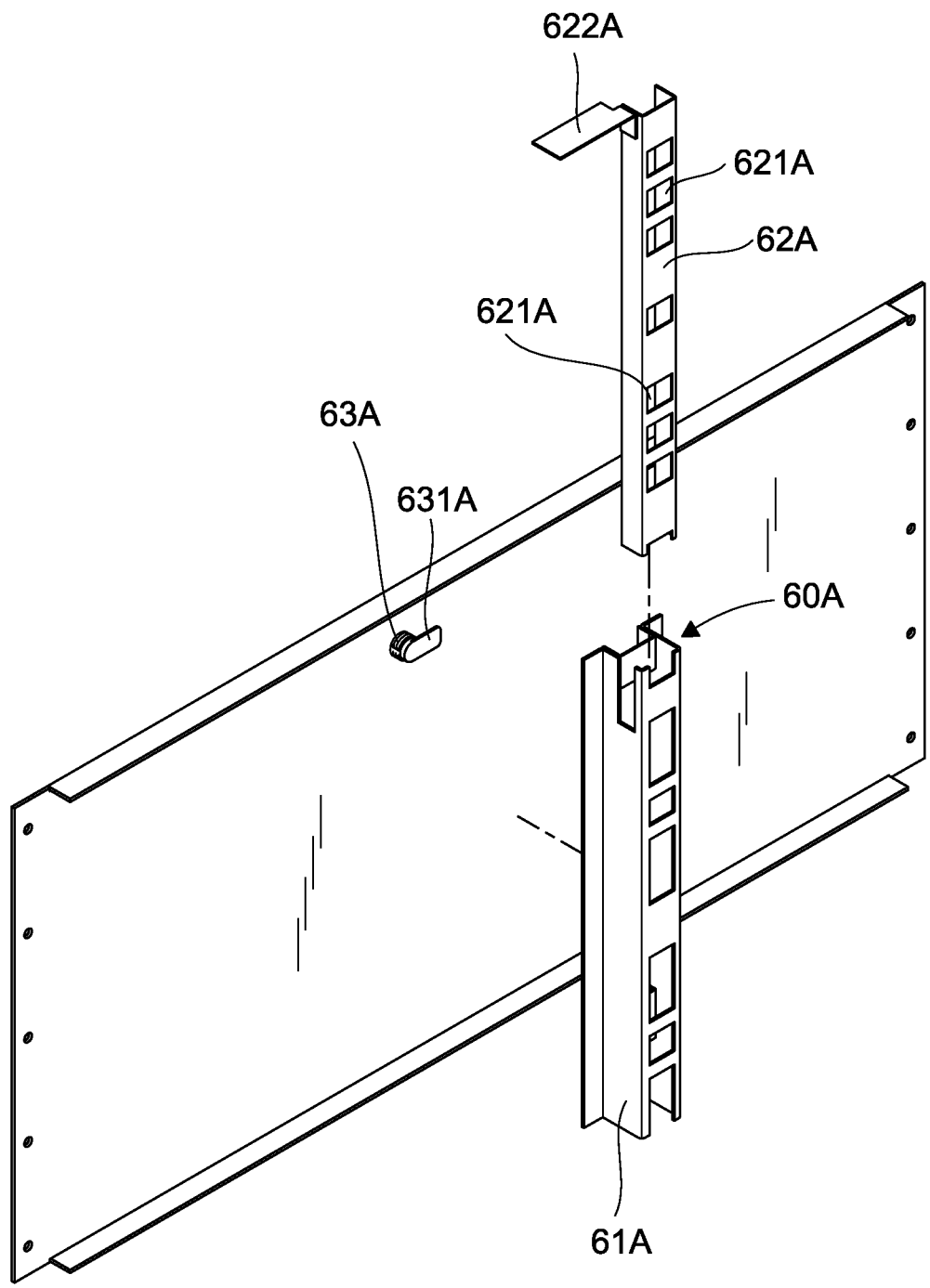
FIG. 10 is an exploded view of FIG. 9.
Figure 11:
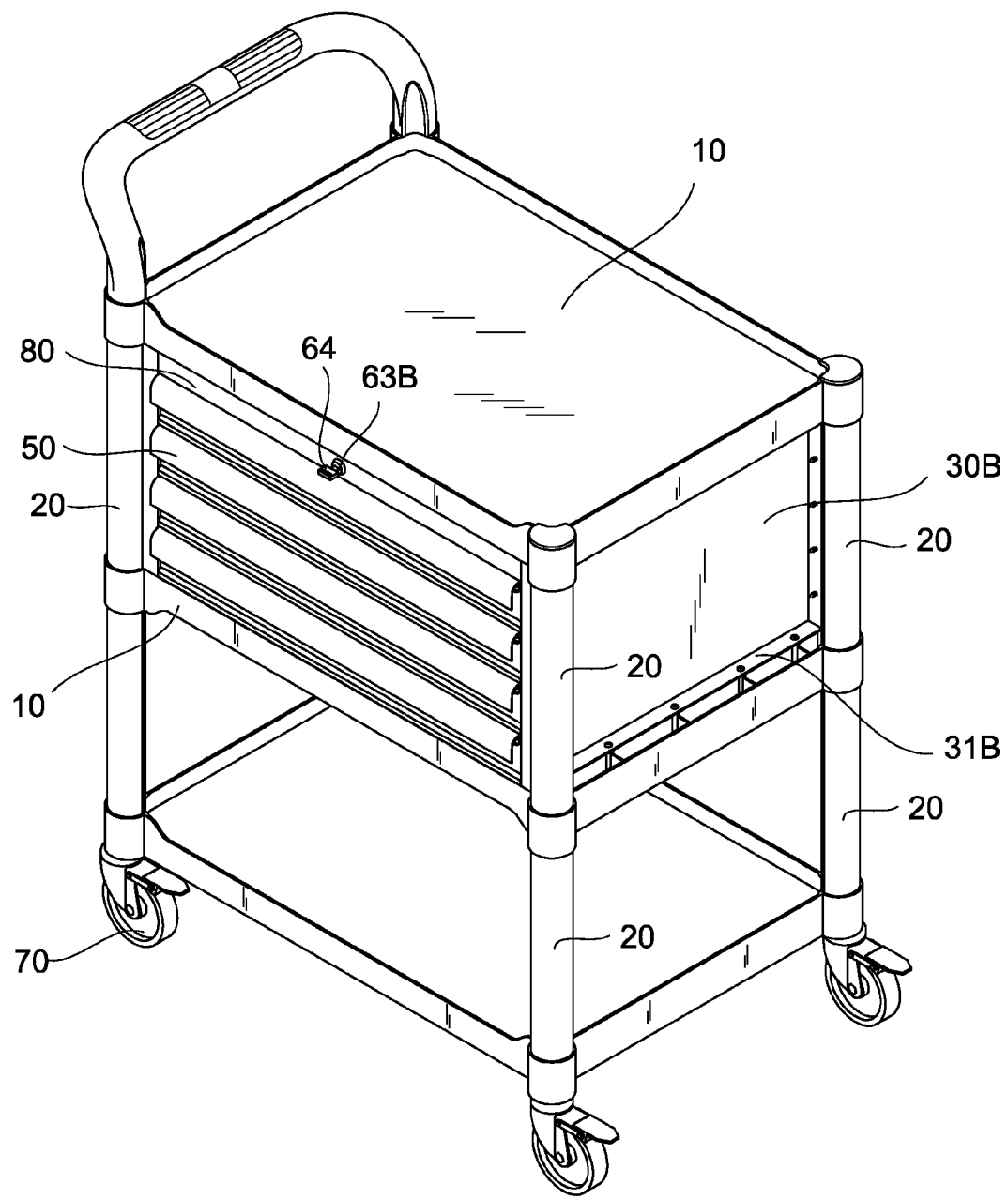
FIG. 11 is a perspective view of a takedown utility cart according to the invention, the takedown utility cart incorporating a third preferred embodiment of the lock assembly.
Figure 12:
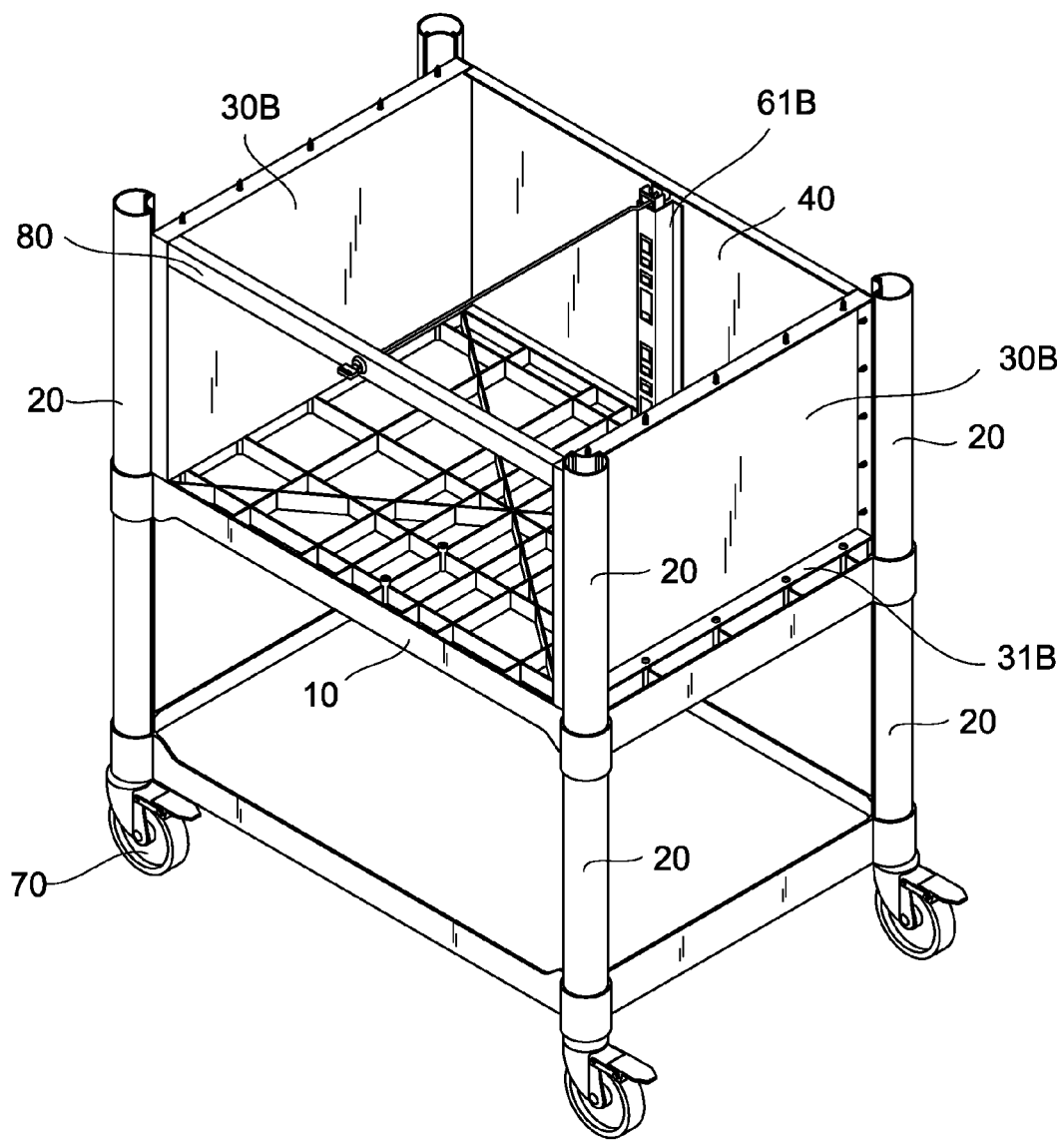
FIG. 12 is a perspective view of the frame and the wheels of the utility cart of FIG. 11.
Figure 13:
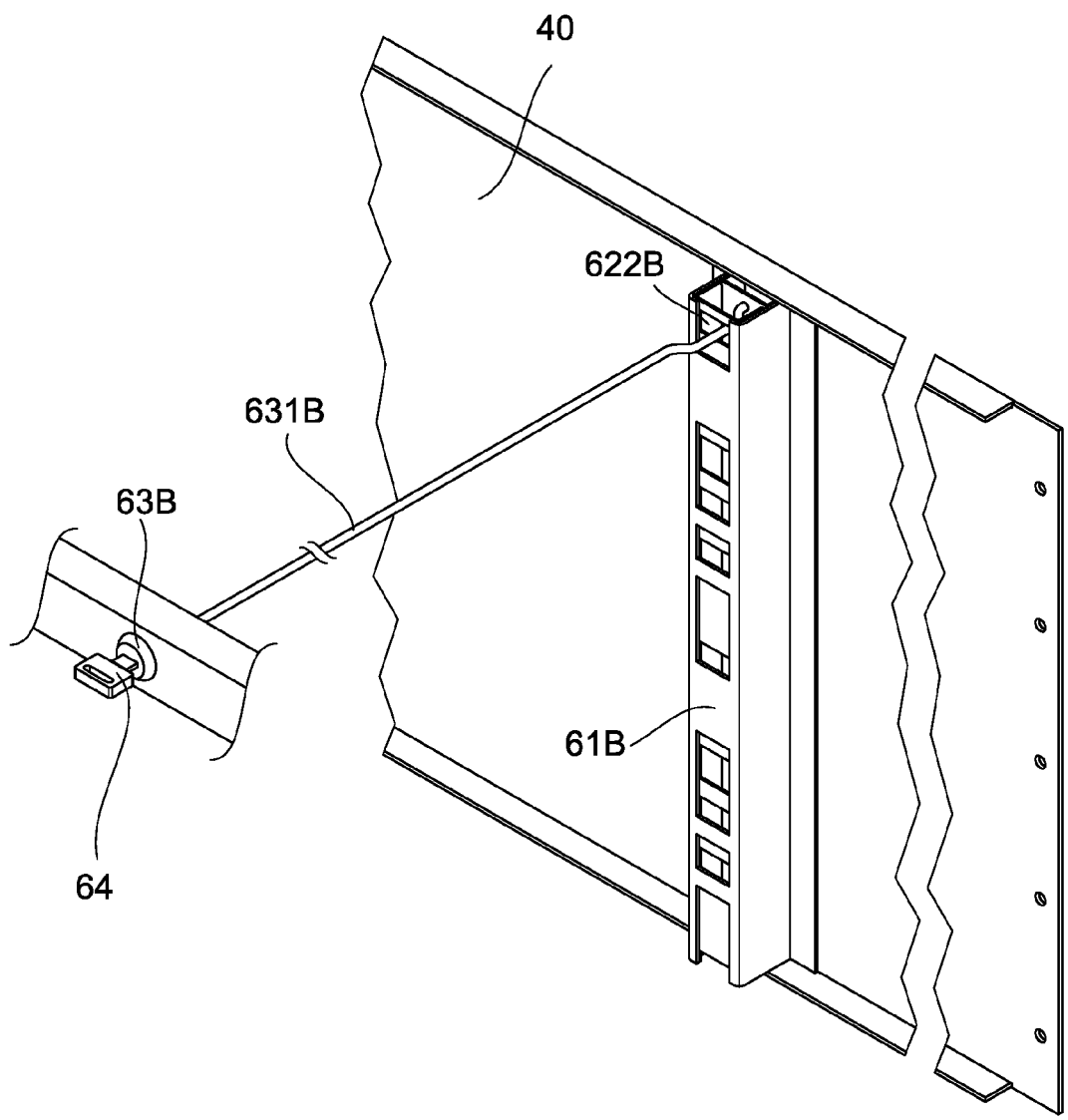
FIG. 13 is a perspective view schematically depicting the lock assembly of the third preferred embodiment.
Figure 14:
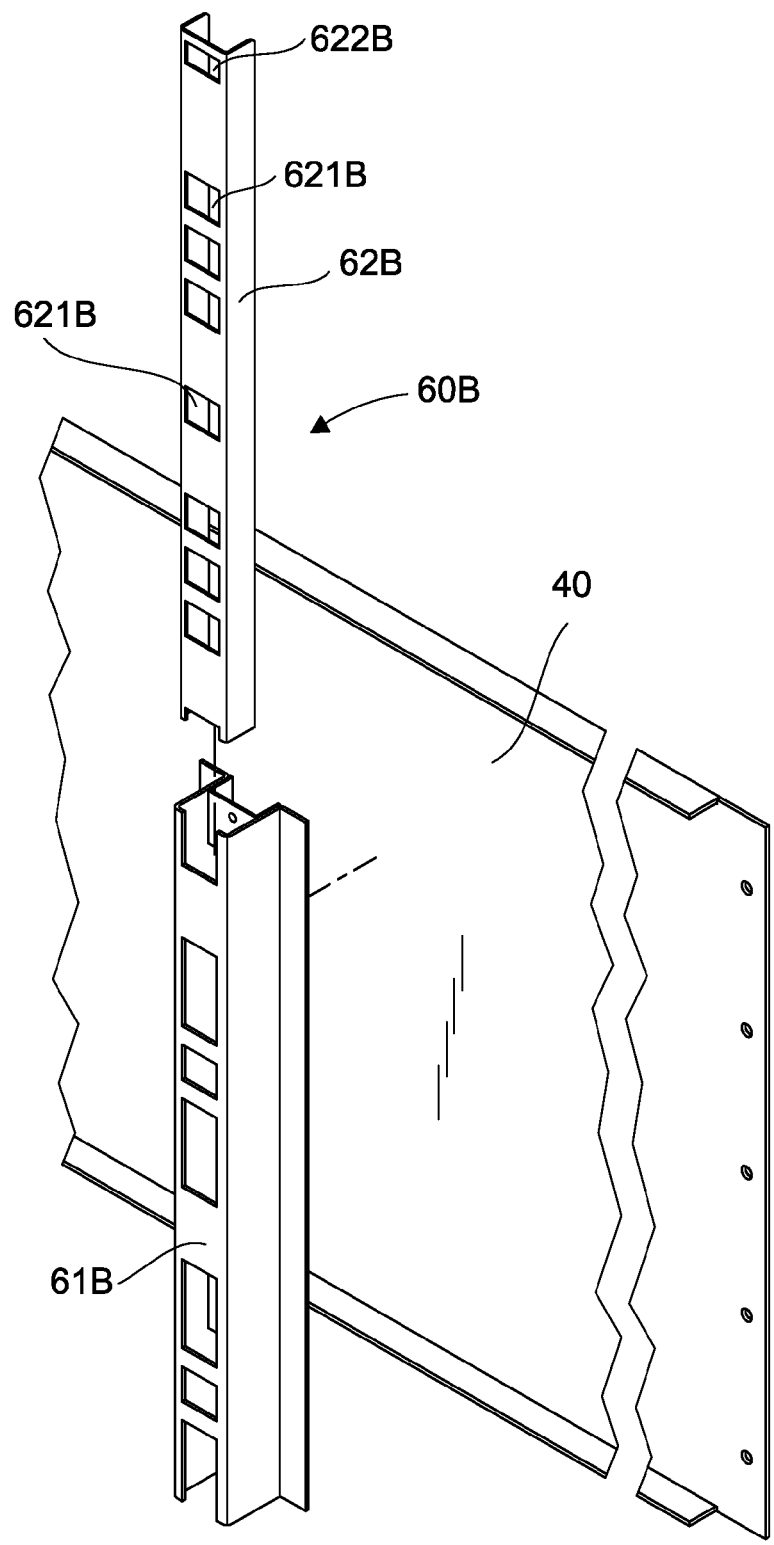
FIG. 14 is an exploded view of the lock assembly of the third preferred embodiment and the rear panel.

As shown in FIGS. 9 and 10, components and operations of a lock assembly 60A of a second preferred embodiment of the takedown utility cart are described below. Characteristics of the second preferred embodiment are described below. The lock assembly 60A includes an elongated, hollow sliding seat 61A, an elongated, hollow lock member 62A having a plurality of apertures 621A disposed vertically on one surface, and a laterally projecting stop member 622A above the top aperture 621A, and a lock element 63A having a lock lever 631A contacting a bottom of the stop member 622A. The lock member 62A is shaped to complimentarily dispose in the sliding seat 61A. First, a key (not shown) is inserted into the lock element 63A to rotate the lock lever 631A to lift the stop member 622A and the lock member 62A so that the snapping member 52 clears the aperture 621A. As a result, the drawer 50 having the snapping member 52 is free to pull.

As shown in FIGS. 11 to 14, components and operations of a lock assembly 60B of a third preferred embodiment of the takedown utility cart are described below. Characteristics of the third preferred embodiment are described below as well. A front panel 80 is provided between the front beam 12 of the upper platform 10 and the topmost drawer 50. Two ends of the front panel 80 are threadedly secured to front ends of two opposite end members 31B of the side walls 30B. The lock assembly 60B includes an elongated, hollow sliding seat 61B, an elongated, hollow lock member 62B having a plurality of apertures 621B disposed vertically on one surface, and a lock hole 622B above the top aperture 621B, and a lock element 63B having a link 631B. The link 631B has a bent open end received in the lock hole 622B. The snapping member 52 is received in the aperture 621B. The lock member 62B is shaped to complimentarily dispose in the sliding seat 61B. An individual may insert a key 64 into the lock element 63B to rotate the link 631B which in turn lifts the lock hole 622B and the lock member 62B so that the snapping member 52 clears the aperture 621B. As a result, the drawer 50 having the snapping member 52 is free to pull.

While the invention has been described in terms of preferred embodiments, those skilled in the art will recognize that the invention can be practiced with modifications within the spirit and scope of the appended claims.

What is claimed is:

1. A takedown utility cart comprising:
   a plurality of rectangular platforms each having four corners, each platform including a main panel made of plastic, and four beams on four edges of the main panel respectively;
   four sets of a plurality of tubular post sections, each set of the post sections secured through one corners of the platforms;
   a plurality of side walls each threadedly fastened between sides of two adjacent platforms, each side wall having front and rear ends urging against the post sections of one set and the post sections of the adjacent set respectively, each side wall including two end members;
   at least one rear panel having two sides threadedly secured to rear ends of the side walls respectively so that an open space is defined by the platforms, the side walls, and the at least one rear panel;
   at least one set of two slides on inner surfaces of the side walls;
   at least one drawer each configured to retractably mount in the space by slidably securing to the slides of the same set; and
   a lock assembly mounted on the rear panel for locking or unlocking the drawer;
   wherein the main panel includes a latticework formed in an area surrounded by the beams, and a plurality of thread holes formed in the latticework so that the side wall and the main panel are configured to secure together.

2. The takedown utility cart of claim 1, wherein each of the end members includes a plurality of threaded holes aligned with the thread holes.

3. The takedown utility cart of claim 1, further comprising a plurality of wheels rotatably mounted on a bottom of the utility cart.

4. The takedown utility cart of claim 1, further comprising four joints at the four corners of the respective platform, and each joint is configured to fasten an end of the respective post section.

5. The takedown utility cart of claim 1, wherein the drawer includes a projecting snapping member on a rear end.

6. The takedown utility cart of claim 5, wherein the lock assembly includes an elongated, hollow sliding seat, an elongated, hollow lock member (62) having a plurality of apertures disposed vertically on one surface, and a lock hole (622) above the apertures, and a lock element (63) having an eccentric rod (631); wherein the snapping member is received in one of the apertures, the lock member is shaped to complimentarily dispose in the sliding seat, and the eccentric rod is rotated to lift both the lock hole and the lock member to allow the snapping member to clear the aperture.

7. The takedown utility cart of claim 5, wherein the lock assembly includes an elongated, hollow sliding seat, an elongated, hollow lock member (62A) having a plurality of apertures (621A) disposed vertically on one surface, and a laterally projecting stop member (622A) above the apertures, and a lock element (63A) having a lock lever (631A); wherein the snapping member contacts a bottom of the stop member, the lock member is shaped to complimentarily dispose in the sliding seat, and the lock lever is rotated to lift both the stop member and the lock member to allow the snapping member to clear the aperture.

8. The takedown utility cart of claim 5, wherein the lock assembly includes an elongated, hollow sliding seat, an elongated, hollow lock member (62B) having a plurality of apertures (621B) disposed vertically on one surface, and a lock hole (622B) above the apertures, and a lock element (63B) having a link (631B); wherein the link has a bent open end received in the lock hole, the snapping member is received in one of the apertures, the lock member is shaped to complimentarily dispose in the sliding seat, and the link is rotated to lifts-both the lock hole and the lock member to allow the snapping member to clear the aperture.

9. The takedown utility cart of claim 1, further comprising a front panel between a front one of the beams of an upper one of the platforms and the at least one drawer, wherein one end of the front panel is threadedly secured to a front end of one end member of the side wall, and wherein the other end of the front panel is threadedly secured to a front end of the other end member of the side wall.

* * * * *